United States Patent Office 3,481,275
Patented Dec. 2, 1969

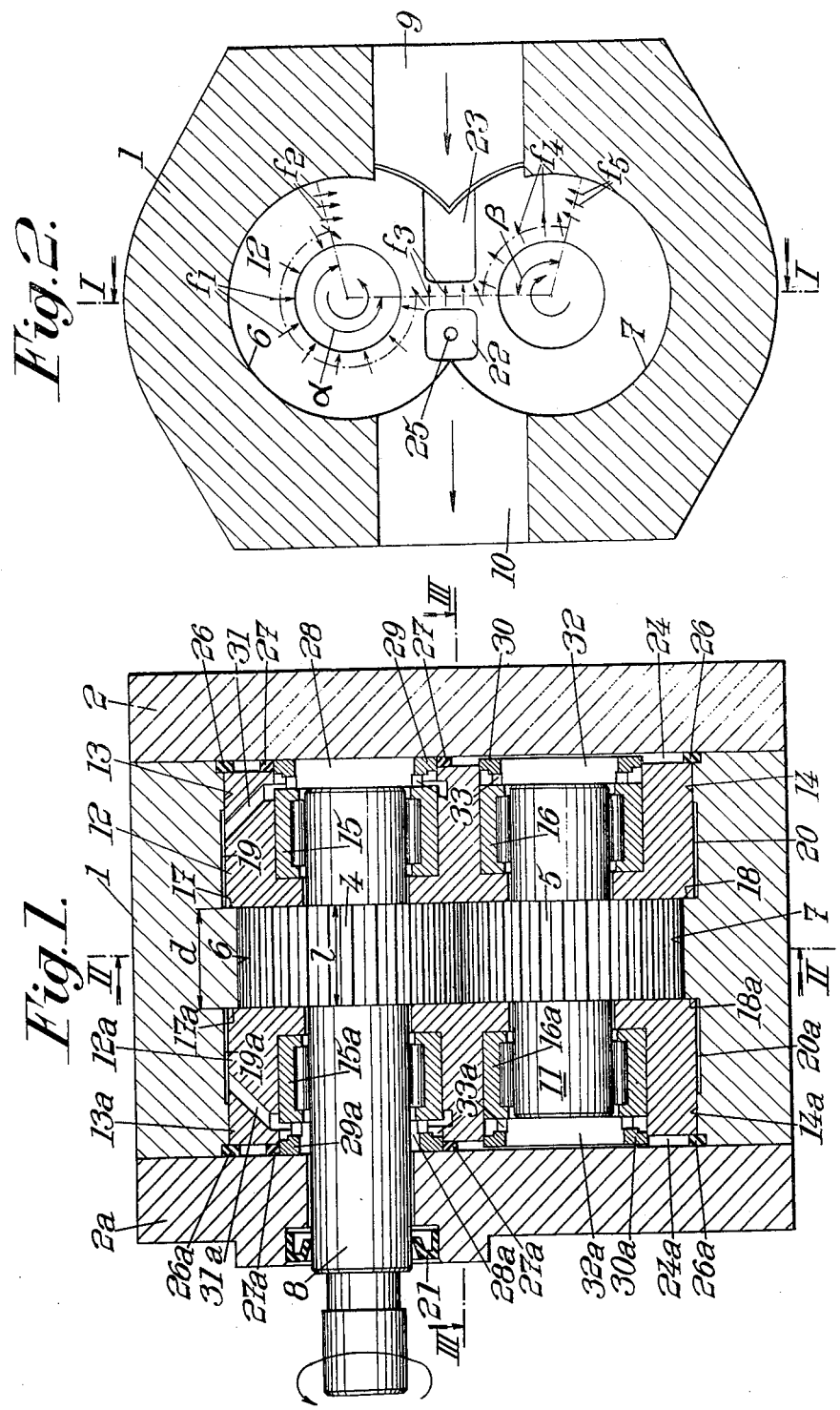

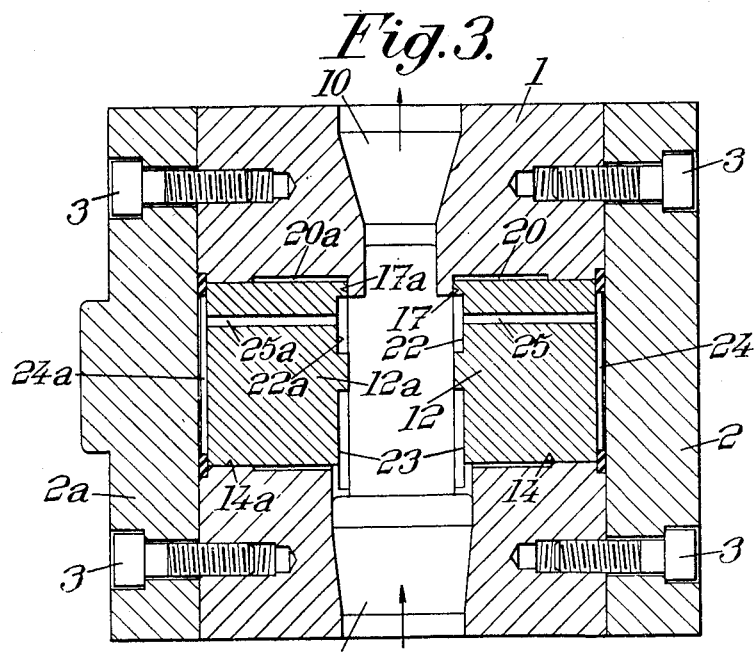
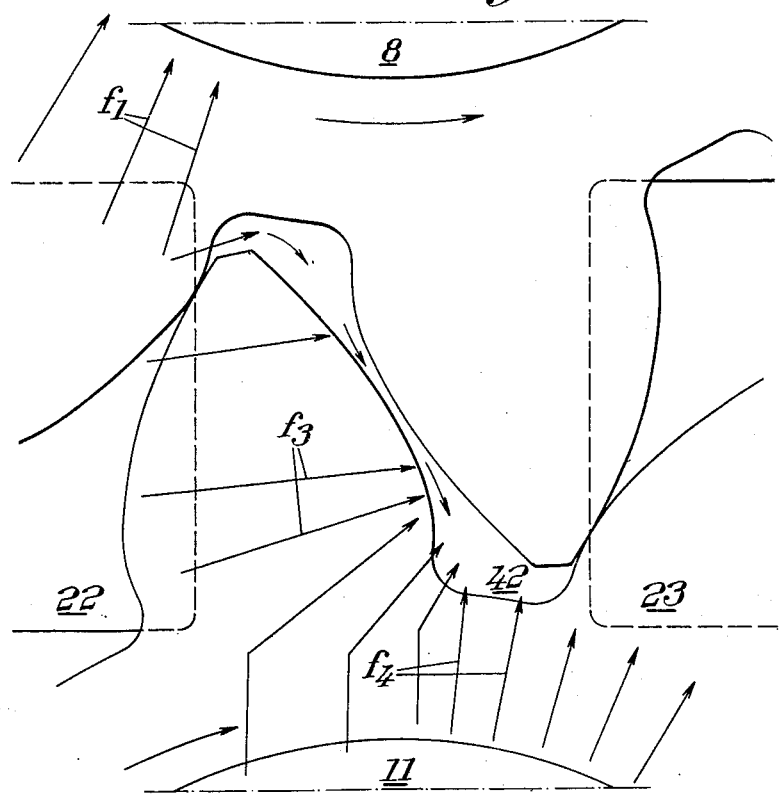

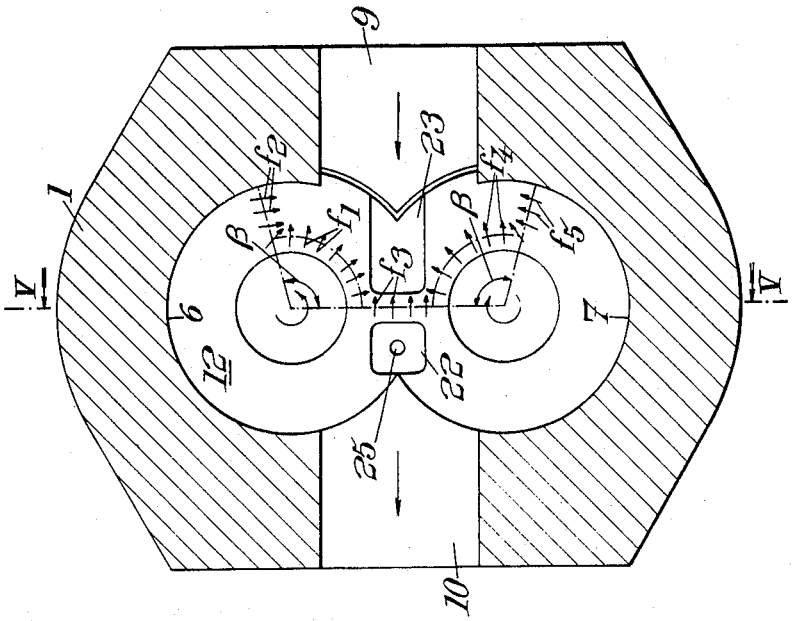
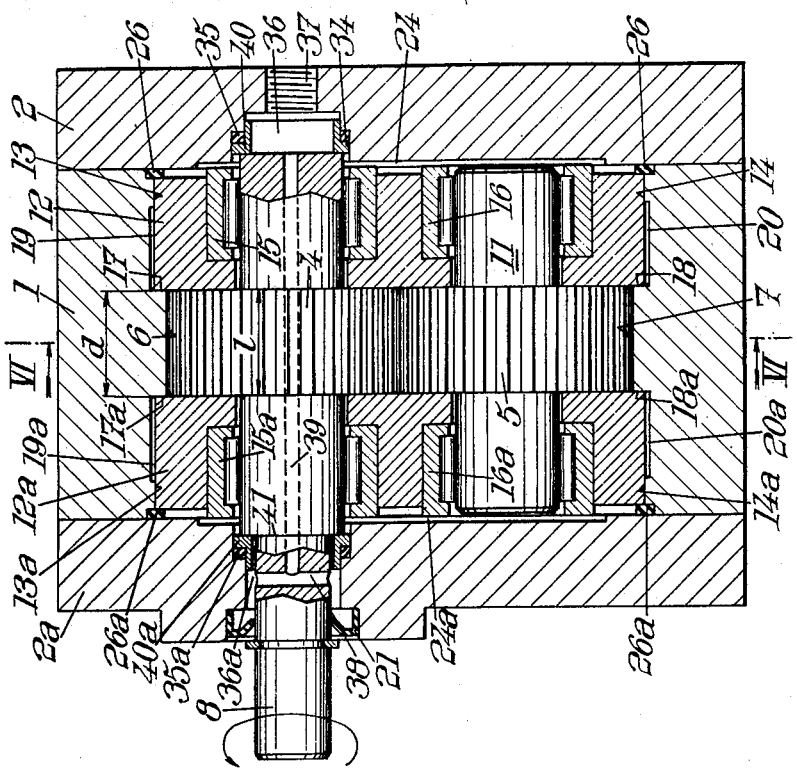

3,481,275
HYDRAULIC GEAR-PUMPS AND GEAR-MOTORS
Robert Gelin, Lyon, France, assignor to Societe Industrielle Generale de Mecanique Appliquee S.I.G.M.A., Paris, France, a society of France
Filed Apr. 12, 1968, Ser. No. 720,817
Claims priority, application France, Apr. 14, 1967, 102,844
Int. Cl. F04c *1/08;* F04b *21/08*
U.S. Cl. 103—126                      7 Claims

ABSTRACT OF THE DISCLOSURE

The shafts of the gears in mesh are carried, on each of their sides, by a common rigid bearing axially movable inside a casing. High pressure liquid is introduced into chambers partially limited by the remote (with respect to the gears) faces of the bearings for urging these bearings towards the gears against abutments whose separation is slightly greater than the width of the gears. One of the shafts, called "coupling shaft," traverses the casing on one side only; the other shaft, called "interior shaft," does not traverse the casing. Each chamber extends opposite at least the major part of the bearing and opposite the interior shaft. The chamber on the non-traversed side is isolated from the zone situated opposite the non-traversing end of the coupling shaft, and preferably the other chamber is isolated from a corresponding zone around the traversing end of the coupling shaft.

---

The present invention relates to hydraulic gear-pumps and gear-motors of the type in which the shafts of the gears in mesh are carried, on each of their sides, by a common rigid bearing, movable in the axial direction at the interior of a casing, and which comprise, for exerting on the two bearings a force which tends to move them towards the side of the gears by applying them against abutments whose separation is slightly greater than the width of the gears, means for introducing, into chambers limited partially by the lateral faces of these bearings which lateral faces are remote from the gears, some liquid taken off at a region of the apparatus at high pressures—namely at the outlet of the pump or at the inlet of the motor—one of the shafts (called "coupling shaft") traversing the casing on one side only, whereas the other shaft (called "interior shaft") does not traverse the casing.

An object of the present invention is to provide pumps and motors of this type which fulfill the requirements of practice, notably from the points of view of the efficiency and the simplicity of construction.

According to the principal feature of the invention, on each side of the pumps and motors of the type in question, the above mentioned chamber is arranged in a manner such that it extends not only opposite the major part at least of the bearing, but also opposite the interior shaft, but that this chamber is isolated from the zone situated opposite the non-traversing end of the coupling shaft.

The invention will be easily understood from the following specific description, given merely by way of example, of particular embodiments of pumps arranged according to the invention. These particular embodiments are described with reference to the accompanying drawings, in which:

FIGURE 1 shows, in axial section along I—I of FIGURE 2, a hydraulic pump established according to a first embodiment of the invention;

FIGURES 2 and 3 are sections along II—II and III—III respectively of FIGURE 1, the gears being supposed to be removed;

FIGURE 4 shows, on a larger scale, the meshing zone of the gears of the pump of FIGURES 1 to 3;

Figure 7:
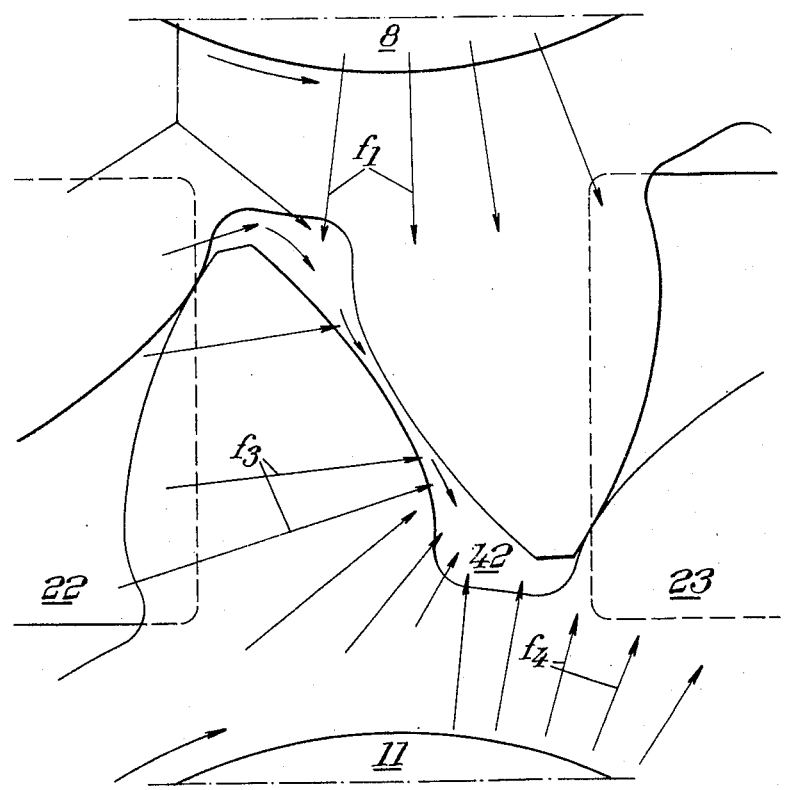

And FIGURES 5, 6 and 7, show similarly to FIGURES 1, 2 and 4 respectively, a pump established according to a second embodiment of the invention, FIGURE 5 being a section along V—V of FIGURE 6, and FIGURE 6 being a section along VI—VI of FIGURE 5.

With regard to the pump in its overall aspect, it is constructed according to the indications given in U.S. patent application Ser. No. 525,396 filed by the present applicant on February 7, 1966 for "Hydraulic Gear-Pumps and Motors," now Patent No. 3,395,646, by a stator comprising a central body 1 and two side plates 2 and 2*a* assembled by bolts 3, and by two gears in mesh 4 and 5 disposed in two truncated bores 6 and 7, the gear 4 being rigid with a coupling shaft or driving shaft 8 which traverses the side plate 2*a* only. An inlet orifice 9 and an outlet orifice 10 communicate with the connecting zone between the bores 6 and 7, the shaft 8 always turning in the same sense, as indicated by the arrow in FIGURES 1 and 5. The gear 5 is itself rigid with an interior shaft or driven shaft 11 which does not traverse the side plates 2 and 2*a*. A packing 21 is provided where the shaft 8 traverses the side plate 2*a*.

The shafts 8 and 11 are disposed in rigid, movable bearings 12 and 12*a* which, on each side of the gears, are formed in a single, integral piece, and have approximately the contour of a figure eight. The bearings 12 and 12*a* are housing in truncated bores 13, 14 and 13*a*, 14*a* which, in the body 1, have the same axes as the bores 6 and 7. Advantageously, roller- or ball-bearings 15, 16 and 15*a*, 16*a* are interposed between the bearings 12, 12*a* and the shafts 8, 11. Each bearing comprises two grooves 22 and 23 serving respectively for the filling and the decompression.

The lateral face of each bearing, which lateral face is remote from the side of the corresponding gear, forms one of the walls of a chamber 24 or 24*a* which receives some liquid under pressure tending to displace the bearing in question towards the side of the gear. This liquid is taken off at the outlet of the pump, preferably by the intermediary of passages 25 and 25*a* passing respectively through the movable bearings from one side to the other and originating in a filling groove 22 or 22*a*.

Abutment means are provided limiting, to a value slightly greater than the width *l* of a gear, the minimum distance *d* separating the lateral faces that face each other of the bearings 12 and 12*a*. Advantageously, these abutment means are formed by shoulders 17, 17*a* and 18, 18*a* provided in the pump body 1, between the central bore 6 or 7 and the lateral bores 13, 13*a* or 14, 14*a*, the pairs of shoulders 17, 17*a* and 18, 18*a* being thus separated by the distance *d*. Preferably, the shoulders in question are formed by the sides of an extra thickness of the body 1.

Clearances 19, 19*a*, 20 and 20*a*, or zones of enlarged diameter, can be provided in the bores 13, 13*a* and 14, 14*a* from the ends of the central bores 6 and 7, so that the bearings 12 and 12*a* are only guided in the body 1 by a fraction of their length, these clearances communicating on the one hand with each other, on each side of the pump, and on the other hand with the inlet orifice 9, to permit the evacuation of leakage as will be explained hereafter.

The gears 4 and 5 are mounted with a sufficient axial freedom so that they can be centered automatically with respect to the shoulders 17, 17*a*, 18 and 18*a* by the movable bearings 12 and 12*a*.

It is known that the operation of this pump is the following, the sense of circulation of the liquid and of rotation of the gears being indicated by the arrows in the figures.

Due to the lateral play (*d*−*l*) existing between the gears and the bearings, which lateral play is very small (of the order of a few hundredths of a millimeter), dirt contained in the liquid displaced by the pump, which dirt can slide in between the sides of the gears and the lateral faces of the bearings, does not disturb the operation of these bearings and cannot cause abrasion of the sides of the gears. The loss of efficiency that results from this play is negligible in practice.

According to the principal feature of the invention, the chambers 24 and 24a extend, on each side of the pump, not only opposite the lateral faces of each bearing 12, 12a, which lateral faces are remote from the sides of the corresponding gears 4, 5 but also opposite the driven shaft 11. Moreover, these chambers are isolated from the zones situated opposite the non-traversing end of the driving shaft 8 (at the right of FIGURES 1 and 5) and around the traversing part of this shaft 8 (at the left of these figures).

These chambers are bordered exteriorly by packings 26 and 26a disposed between the movable bearings and the corresponding side plates 2 and 2a.

According to a first embodiment, represented in FIGURES 1 to 4, each chamber 24 or 24a is limited by two interior packings 27 or 27a isolating the chamber 24 or 24a from the zone 28 or 28a situated opposite the driving shaft 8, which zone is discharged by connection with the inlet. The zone 28, non-traversed by the shaft 8, is of circular section, whereas the zone 28a is of annular section.

In each zone 28 or 28a, a spacing ring 29 or 29a can be housed analogous to the rings 30 or 30a which will be mentioned hereafter, the ring 29a being traversed by the shaft 8. The two rings 29 and 29a serve as interior supports for the packings 27, 27a, whereas the four rings serve as axial supports for the bearings.

Advantageously, each bearing is provided with a passage 31 (or 31a) opening on one side into the zone 28 or 28a, and on the other, into a clearance 19 or 19a, permitting the return of leakage to the inlet orifice 9, since, as can be seen in FIGURE 3, these clearances communicate freely with this orifice. The chamber 28a is extended axially to the packing 21.

The spacing rings 29 or 29a, mentioned above, are arranged in a manner to permit the flow of leakage towards the passage 31 or 31a, whereas the rings 30 or 30a are similarly arranged to permit the liquid under pressure coming from the passage 25 or 25a to fill freely the zone 32 or 32a situated opposite the ends of the shaft 11. It should be noted that the zones 32 or 32a form a part respectively of the chambers 24 and 24a. This can be arranged, in particular, by providing these rings with radial slots 33 or 33a or the like.

According to another embodiment represented in FIGURES 5 to 7, the chamber 24 (or 24a) is limited by two packings, namely the exterior packing 26 (26a) and an interior packing 35 (or 35a) established either around the traversing part of the driving shaft 8 (packing 35a delimiting the chamber 24a), or between an extension of this shaft, which penetrates through an alveole 34 into the side plate 2 without traversing this side plate, and the side plate 2 itself (packing 35 delimiting the chamber 24). Between the packing 35 and the adjacent end of the shaft 8 is disposed a protection ring 40. Similarly, between the packing 35a and a shoulder 41 of the shaft 8 is disposed a protection ring 40a. The packings 35 and 35a and the rings 40 and 40a have the same transverse sections.

The non-traversing end of the driving shaft 8 determines with the side plate 2 a zone 36 connected through a hole 37 to the inlet of the pump, this zone being isolated from the chamber 24 by the interior packing 35. The traversing end of the shaft 8 determines an annular zone 36a also defined by the interior packing 35a which isolates it from the chamber 24a and by the packing 21.

To discharge this annular zone 36a, radial passages 38 can be formed in the shaft 8 which passages communicate on the one hand with this zone and on the other hand with a passage 39 which traverses the length of the shaft to open into the zone 36.

As a result, an improved pump is obtained whose operation is distinguished from the operation of the known pump mentioned above, as will be explained hereafter.

It will be understood that the pressure established in the chambers 24 and 24a applies the bearings against their abutments while centering the gears without hindering their rotation. Moreover, the pressure forces acting on the two ends of the shaft 11 are in equilibrium. On the contrary, a pressure of liquid in the zones 28 and 28a (FIGURES 1 to 4) or 36 and 36a (FIGURES 5 to 7) creates a thrust directed towards the side plate 2a that the shaft 8 traverses, as a result of the different active sections (by which this shaft is subjected to the hydraulic pressure at its two ends). But, due to the fact that this latter pressure is only equal to the inlet pressure, the shaft 8 is not subjected to any appreciable axial thrust.

The advantages of the pump that just been described are the following.

In the first place, the volumetric efficiency of the pump is improved. According to the first embodiment, shown in FIGURES 1 to 4, the zones 28 and 28a contain oil at a pressure intermediate between the inlet pressure and the outlet pressure, which oil, that the bearings 15 and 15a allow to pass, bathes the shaft 8 on both sides of the pinion 4. Leakage, which passes through the lateral play existing between the gear 4 and the bearings 12 and 12a, takes place along the extended sector α (FIGURE 2) where the liquid at the outlet pressure located in the teeth of the gear 4 is put in communication with a liquid at lower pressure, either with the liquid at the inlet pressure (leakage $f_2$ and $f_3$), or with the liquid at intermediate pressure bathing the shaft 8 (leakage $f_1$). Still according to the first embodiment, the driven shaft 11 bathes in a liquid at the outlet pressure that the bearings 16 and 16a allow to pass. Leakage only takes place along the narrow sector β (FIGURE 2) where the liquid at the inlet pressure is put in communication with the liquid at the outlet pressure bathing the shaft 11 (leakage $f_4$) or contained in the teeth (leakage $f_3$ and $f_5$). The first embodiment of the invention (FIGURE 2) limits the leakage between the gear 5, the shaft 11 and the bearings 12 and 12a to one sector, and the second embodiment (FIGURES 5 to 7), for which the driving and driven shafts both bathe in a liquid at the outlet pressure, limits the overall leakage (designated by the same references as in FIGURE 2) to two narrow sectors β (FIGURE 6), which further improves the volumetric efficiency of the pump.

In the second place, a better filling of the teeth is obtained. It is precisely in the zone where the lateral leakage $f_1$, $f_3$ and $f_4$ is located (see FIGURES 2, 4, 6 and 7) that the zone 42 is located which is fed by the groove 23. The supplementary flow coming from the gear 5 improves the filling.

In the third place, the heating of the pump is less, for the leakage liquid which is throttled between the gears and the sides of the bearings relaxes and is heated before being taken up again with the fresh liquid coming from the inlet. In this manner, the flow of a hot liquid in the needle-bearings or ball-bearings, and a general heating of the pump, are avoided.

In the last place, the two embodiments shown permit simplifications of construction, namely the presence of only two passages for leakage (31 and 31a in FIGURE 1), or no passage for leakage in the case of the second embodiment (FIGURE 5). The simplifications are even more important with respect to the interior packings, namely the elimination of the packings corresponding to the driven shaft (FIGURE 1), and in the second embodiment (FIGURE 5), an interior packing 35 opposing a much greater resistance to the extrusion.

Various modifications to the embodiments shown are possible. For example, the roller-bearings 15, 15a, 16 and 16a can be replaced by smooth bearings which can be fitted or machined in the movable bearings 12 and 12a defined hereabove; this modification is possible since the gears and bearings of the pump are subjected to the outlet pressure.

According to another modification, the apparatus forms a hydraulic motor which receives liquid under pressure through the orifice 10 and evacuates it without pressure through the orifice 9, the coupling shaft 8 being then a driven shaft. Needless to say, the advantages of such a hydraulic motor are the same as those which have been mentioned hereabove for a hydraulic pump.

In view of the various modifications which are possible, the present invention should not be limited to the particular embodiments described, since other embodiments could be envisaged within the spirit and scope of the present invention.

What I claim is:

1. Hydraulic gear-apparatus comprising, in combination,
    a casing having a gear housing provided with an inlet and an outlet,
    a pair of gears, carried respectively by a pair of parallel shafts, disposed in mesh with each other in said gear housing, and adapted to co-operate, in rotation, with liquid flowing from said inlet to said outlet,
    one of said shafts, called coupling shaft, traversing the casing on one side only, thus defining a traversed side and a non-traversed side of the apparatus with respect to the gears,
    the other of said shafts, called interior shaft, being disposed entirely at the interior of said casing without traversing said casing,
    two rigid bearings mounted in said casing one on each side of the gears, each bearing being common to and carrying both shafts on one side of the gears, and each bearing being axially movable in said casing,
    two chambers formed in said casing on the remote side, respectively, of said two bearings, from the gears, each chamber being partially limited by the remote, with respect to the gears, lateral face of the corresponding bearing,
    means for introducing into said chambers some liquid taken from a region of the apparatus at high pressure, for exerting on said two bearings a force tending to move them towards said gears,
    abutment means provided in said casing for limiting the minimum separation between said two bearings to a value slightly greater than the width of said gears,
    each chamber extending opposite at least the major part of the corresponding bearing, and opposite said interior shaft,
    and the chamber on the non-traversed side of the apparatus being isolated from the zone situated opposite the non-traversing end of said coupling shaft.

2. Apparatus according to claim 1, wherein said chambers are each limited by two packings located between the lateral wall of the casing and the adjacent face of the bearing, namely an exterior packing located on the periphery of the bearing, and an interior packing located, on the non-traversed side of the apparatus, around said zone situated opposite the non-traversing end of said coupling shaft, and on the traversed side of the apparatus, around a zone surrounding the traversing end of said coupling shaft, both said zones being thus isolated by the respective interior packings from the respective chambers, said zones being furthermore connected to a region of the apparatus at low pressure.

3. Apparatus according to claim 1, wherein the non-traversing end of the coupling shaft penetrates into the lateral wall of the casing without traversing this lateral wall, and wherein said chambers are each limited by two packings, namely an exterior packing located on the periphery of the bearing between the lateral wall of the casing and the adjacent face of the bearing, and an interior packing located, on the non-traversed side of the apparatus, between the lateral wall of the casing and the portion of the non-traversing end of the coupling shaft that penetrates into said lateral wall, and on the traversed side of the apparatus, around the traversing portion of the coupling shaft and between said traversing portion and the lateral wall of the casing, the two interior packings having practically the same section and isolating the respective chambers, on the non-traversed side of the apparatus, from said zone situated opposite the non-traversing end of said coupling shaft, and on the traversed side of the apparatus, from a zone situated around the traversing portion of the coupling shaft, both said zones being connected to a region of the apparatus at low pressure.

4. Apparatus according to claim 2, in the form of a gear-pump, wherein said high pressure region is the outlet and said low pressure region is the inlet.

5. Apparatus according to claim 3, in the form of a gear-pump, wherein said high pressure region is the outlet and said low pressure region is the inlet.

6. Apparatus according to claime 2, in the form of a gear-motor, wherein said pressure region is the inlet and said low pressure region is the outlet.

7. Apparatus according to claim 3, in the form of a gear-motor, wherein said high pressure region is the inlet and said low pressure region is the outlet.

References Cited

UNITED STATES PATENTS

| 2,714,856 | 8/1955 | Kane | 103—126 |
| 2,981,200 | 4/1961 | Stephens | 103—126 |
| 3,073,251 | 1/1963 | Weigert | 103—126 |
| 3,285,188 | 11/1966 | Kita | 103—126 |
| 3,395,649 | 8/1968 | Gelin | 103—126 |

DONLEY J. STOCKING, Primary Examiner

WILBUR J. GOODLIN, Assistant Examiner

U.S. Cl. X.R.

103—216